US011110653B2

(12) United States Patent
Rudisill et al.

(10) Patent No.: US 11,110,653 B2
(45) Date of Patent: Sep. 7, 2021

(54) THREE-DIMENSIONAL (3D) PRINTING (71) Applicant: Hewlett-Packard Development Company, L.P., Houston, TX (US)

(72) Inventors: Stephen G. Rudisill, San Diego, CA (US); Alexey S. Kabalnov, San Diego, CA (US); Keshava A. Prasad, San Diego, CA (US); Sivapackia Ganapathiappan, Palo Alto, CA (US); Jake Wright, San Diego, CA (US); Vladek Kasperchik, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 425 days.

(21) Appl. No.: 15/763,223

(22) PCT Filed: Oct. 23, 2015

(86) PCT No.: PCT/US2015/057185
§ 371 (c)(1),
(2) Date: Mar. 26, 2018

(87) PCT Pub. No.: WO2017/069778
PCT Pub. Date: Apr. 27, 2017

(65) Prior Publication Data
US 2018/0272602 A1    Sep. 27, 2018

(51) Int. Cl.
*B29C 64/188*    (2017.01)
*B33Y 10/00*    (2015.01)
(Continued)

(52) U.S. Cl.
CPC .......... *B29C 64/188* (2017.08); *B29C 64/112* (2017.08); *B29C 64/165* (2017.08);
(Continued)

(58) Field of Classification Search
CPC ....... B29C 64/112; B33Y 10/00; B33Y 30/00; B33Y 50/00; B33Y 70/00; C08K 3/20; C08K 3/22; C08K 2003/0818
(Continued)

(56) References Cited

U.S. PATENT DOCUMENTS

| 5,204,055 A | 4/1993 | Sachs et al. |
| 7,399,571 B2 * | 7/2008 | Bogerd ................... B32B 27/18 |
| | | 430/270.1 |

(Continued)

FOREIGN PATENT DOCUMENTS

| CN | 103980410 | 8/2014 |
| CN | 103980594 | 8/2014 |

(Continued)

OTHER PUBLICATIONS

Tolisnki, Michael, ("Overview of Fillers and Fibers", in Additives for Polyolefins, https://www.sciencedirect.com/topics/chemistry/wollastonite, 2009, Retrieved on Mar. 5, 2021; Tolinski) (Year: 2009).*

(Continued)

*Primary Examiner* — Francisco W Tschen
*Assistant Examiner* — Edgaredmanuel Troche
(74) *Attorney, Agent, or Firm* — Dierker & Kavanaugh PC (57) ABSTRACT

In a three-dimensional printing method example, a polymeric or polymeric composite build material is applied. A fusing agent is applied on at least a portion of the build material. The fusing agent includes an aqueous or non-aqueous vehicle and a plasmonic resonance absorber having absorption at wavelengths ranging from 800 nm to 4000 nm and having transparency at wavelengths ranging from 400 nm to 780 nm dispersed in the aqueous or non-aqueous vehicle. The build material is exposed to electromagnetic (Continued)

radiation, thereby fusing the portion of the build material in contact with the fusing agent to form a layer.

7 Claims, 3 Drawing Sheets

(51) Int. Cl.
  *B29C 64/165* (2017.01)
  *B33Y 70/00* (2020.01)
  *B29C 64/264* (2017.01)
  *B29C 64/112* (2017.01)
  *B29K 77/00* (2006.01)
  *B33Y 50/02* (2015.01)
  *B33Y 30/00* (2015.01)
  *B29C 64/393* (2017.01)

(52) U.S. Cl.
  CPC .......... *B29C 64/264* (2017.08); *B29C 64/393* (2017.08); *B33Y 10/00* (2014.12); *B33Y 30/00* (2014.12); *B33Y 50/02* (2014.12); *B33Y 70/00* (2014.12); *B29K 2077/00* (2013.01)

(58) Field of Classification Search
  USPC .................................................. 264/405, 492
  See application file for complete search history.

(56) References Cited

U.S. PATENT DOCUMENTS

| | | | |
|---|---|---|---|
| 7,972,426 | B2 | 7/2011 | Hinch et al. |
| 8,622,534 | B2* | 1/2014 | Bisson ................. B41J 2/04513 347/100 |
| 8,651,390 | B2 | 2/2014 | Hinch et al. |
| 9,643,359 | B2 | 5/2017 | Baumann et al. |
| 2007/0238056 | A1* | 10/2007 | Baumann ................. B22F 10/10 430/325 |
| 2007/0241482 | A1* | 10/2007 | Giller ..................... B29C 64/165 264/494 |
| 2009/0140336 | A1 | 6/2009 | Li |
| 2011/0193911 | A1* | 8/2011 | Bisson ................... B41J 2/0458 347/17 |
| 2011/0309250 | A1 | 12/2011 | Appleby et al. |
| 2012/0129090 | A1 | 5/2012 | Mamak et al. |
| 2012/0247365 | A1* | 10/2012 | Lussier ................ C09D 11/322 106/31.13 |
| 2014/0147775 | A1 | 5/2014 | Jarvis et al. |
| 2016/0236412 | A1* | 8/2016 | Kusahara ................ B28B 7/465 |

FOREIGN PATENT DOCUMENTS

| | | |
|---|---|---|
| CN | 103762093 | 3/2015 |
| EP | 1724110 | 11/2006 |
| JP | H08300492 | 11/1996 |
| JP | 2007534524 | 11/2007 |
| KR | 20090089561 | 8/2009 |
| WO | WO-2007114895 | 10/2007 |
| WO | WO-2014/056482 | 4/2014 |
| WO | WO-2014078537 | 5/2014 |
| WO | WO-2014089708 | 6/2014 |

OTHER PUBLICATIONS ("Wollastonite A Versatile Functional Filler," https://www.pcimag.com/articles/83563-wollastonite-a-versatile-functional-filler, Posted on Nov. 1, 2002, Retrieved Mar. 5, 2021) (Year: 2002).*

Faraday, Michael. "X. The Bakerian Lecture.—Experimental relations of gold (and other metals) to light." Philosophical Transactions of the Royal Society of London 147 (1857): 145-181.

Garcia, Guillermo, et al. "Dynamically modulating the surface plasmon resonance of doped semiconductor nanocrystals." Nano letters 11.10 (2011): 4415-4420.

Gross, Bethany C., et al. "Evaluation of 3D printing and its potential impact on biotechnology and the chemical sciences." (2014): 3240-3253.

Kanehara, Masayuki, et al. "Indium tin oxide nanoparticles with compositionally tunable surface plasmon resonance frequencies in the near-IR region." Journal of the American Chemical Society 131 49 (2009): 17736-17737.

Milligan, W. O., and R. H. Morriss. "Morphology of Colloidal Gold—A Comparative Study." Journal of the American Chemical Society 86.17 (1964): 3461-3467.

Usui, Hiroyuki, Takeshi Sasaki, and Naoto Koshizaki. "Optical transmittance of indium tin oxide nanoparticles prepared by laser-induced fragmentation in water." The Journal of Physical Chemistry B 110 26 (2006): 12890-12895.

Van der Zande, Bianca MI, et al. "Aqueous gold sols of rod-shaped particles." The Journal of Physical Chemistry B 101.6 (1997): 852-854.

Weiser, H., et al., "Von Weimark's Precipitation Theory and the Formation of Colloidal Gold", Jun. 1932, 10 pages, The Rice Institute, Houston, TX.

* cited by examiner

THREE-DIMENSIONAL (3D) PRINTING

BACKGROUND

Three-dimensional (3D) printing may be an additive printing process used to make three-dimensional solid parts from a digital model. 3D printing is often used in rapid product prototyping, mold generation, and mold master generation. Some 3D printing techniques are considered additive processes because they involve the application of successive layers of material. This is unlike traditional machining processes, which often rely upon the removal of material to create the final part. Materials used in 3D printing often require curing or fusing, which for some materials may be accomplished using heat-assisted extrusion or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the three-dimensional (3D) printing method and the 3D printing system disclosed herein utilize Multi Jet Fusion (MJP). During multi jet fusion, an entire layer of a build material (also referred to as build material particles) is exposed to radiation, but a selected region (in some instances less than the entire layer) of the build material is fused and hardened to become a layer of a 3D part. In the examples disclosed herein, a fusing agent is selectively deposited in contact with the selected region of the build material. The fusing agent(s) is capable of penetrating into the layer of the build material and spreading onto the exterior surface of the build material. This fusing agent is capable of absorbing radiation and converting the absorbed radiation to thermal energy, which in turn melts or sinters the build material that is in contact with the fusing agent. This causes the build material to fuse, bind, cure, etc. to form the layer of the 3D part.

Fusing agents used in multi jet fusion tend to have significant absorption (e.g., 80%) in the visible region (400 nm-780 nm). This absorption results in strongly colored, e.g., black, or strongly colored, 3D parts. Examples of the method and system disclosed herein utilize a fusing agent containing a plasmonic resonance absorber dispersed in an aqueous or non-aqueous vehicle. The fusing agent, containing the plasmonic resonance absorber, has absorption at wavelengths ranging from 800 nm to 4000 nm and transparency at wavelengths ranging from 400 nm to 780 nm. As used herein "absorption" means that at least 80% of radiation having wavelengths ranging from 800 nm to 4000 nm is absorbed. As used herein "transparency" means that 20% or less of radiation having wavelengths ranging from 400 nm to 780 nm is absorbed. This absorption and transparency allows the fusing agent to absorb enough radiation to fuse the build material in contact therewith while causing the 3D part to be white or slightly colored.

As used herein, the terms "3D printed part," "3D part," or "part" may be a completed 3D printed part or a layer of a 3D printed part.

Figure 1:
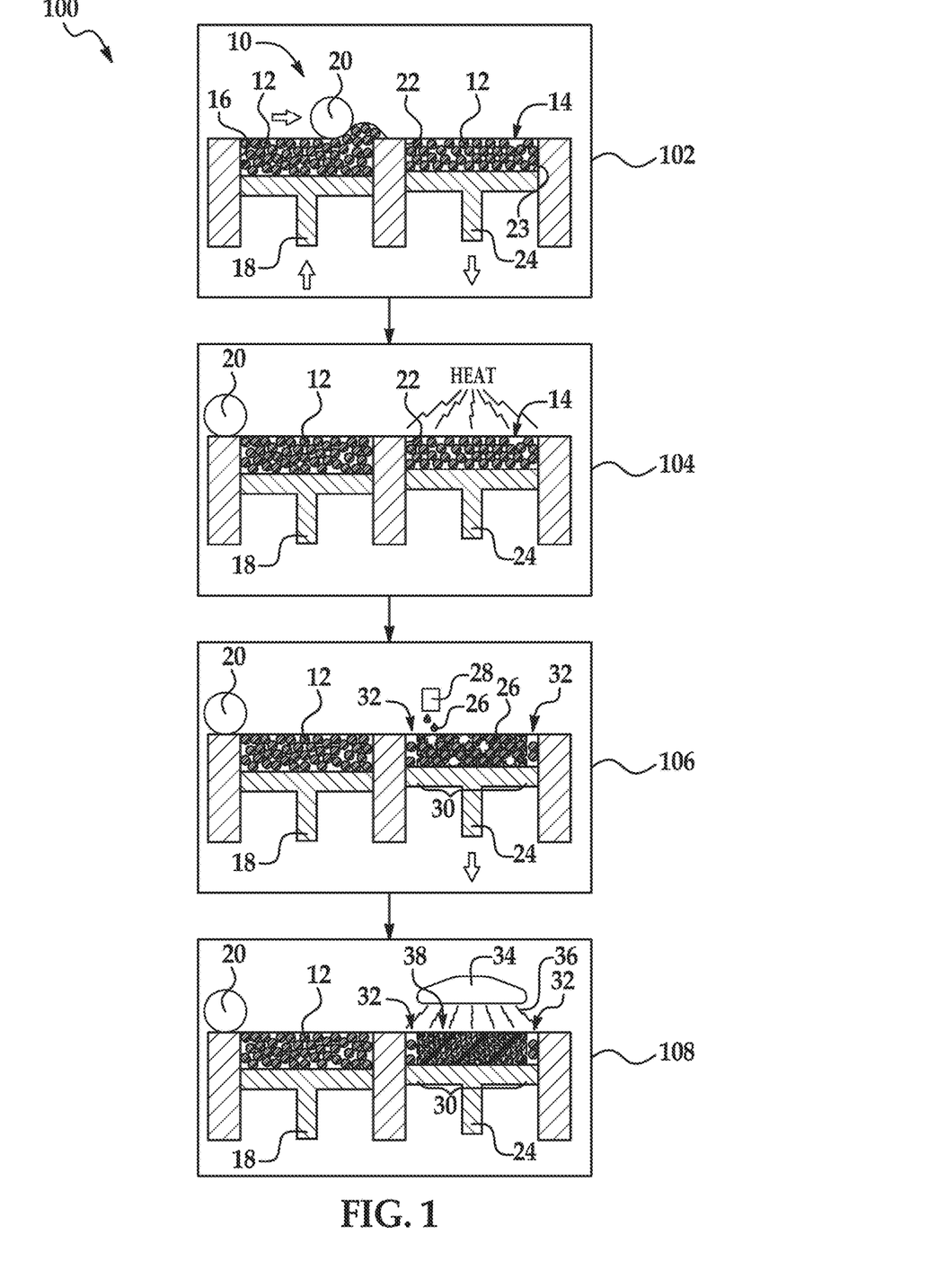
FIG. 1 is a flow diagram illustrating an example of a 3D printing method disclosed herein.

An example of the 3D printing method 100 is depicted in FIG. 1. As an example, the method 100 may be used to create a slightly colored or white 3D part.

As shown at reference numeral 102, the method 100 includes applying a polymeric or polymeric composite build material 12. One layer 14 of the build material 12 has been applied.

The build material 12 may be a powder, a liquid, a paste, or a gel. The build material 12 may be a polymeric material or may be a composite material of polymer and ceramic. Examples of polymeric build material 12 include semi-crystalline thermoplastic materials with a wide processing window of greater than 5° C. (i.e., the temperature range between the melting point and the re-crystallization temperature. Some specific examples of the polymeric build material 12 include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the polymeric build material 12 include polyethylene, polyethylene terephthalate (PET), and an amorphous variation of these materials. Still other examples of suitable polymeric build materials 12 include polystyrene, polyacetals, polypropylene, polycarbonate, polyester, thermal polyurethanes, other engineering plastics, and blends of any two or more of the polymers listed herein. Core shell polymer particles of these materials may also be used.

Any of the previously listed polymeric build materials 12 may be combined with ceramic particles to form the composite build material 12. Examples of suitable ceramic particles include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. The amount of ceramic particles that may be combined with the polymeric build material 12 may depend on the polymeric build material 12 used, the ceramic particles used, and the 3D part 38 to be formed. In one example, the ceramic particles may be present in an amount ranging from about 1 wt % to about 20 wt % based on the total wt % of the build material 12.

The build material 12 may have a melting point ranging from about 50° C. to about 400° C. As examples, the build material 12 may be a polyamide having a melting point of 180° C., or thermal polyurethanes having a melting point ranging from about 100° C. to about 165° C.

The build material 12 may be made up of similarly sized particles or differently sized particles. In the examples shown herein, the build material 12 includes similarly sized particles. The term "size", as used herein with regard to the build material 12, refers to the diameter of a spherical particle, or the average diameter of a non-spherical particle (i.e., the average of multiple diameters across the particle). In an example, the average size of the particles of the build material 12 ranges from 5 μm to about 100 μm.

It is to be understood that the build material 12 may include, in addition to polymer or composite particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 12.

Flow aid(s) may be added to improve the coating flowability of the build material 12. Flow aid(s) may be particularly beneficial when the particles of the build material 12 are less than 25 µm in size. The flow aid improves the flowability of the build material 12 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the build material 12.

In the example shown at reference numeral 102, applying the build material includes the use of the printing system 10. The printing system 10 may include a supply bed 16 (including a supply of the build material 12), a delivery piston 18, a roller 20, a fabrication bed 22 (having a contact surface 23), and a fabrication piston 24. Each of these physical elements may be operatively connected to a central processing unit (not shown) of the printing system. The central processing unit (e.g., running computer readable instructions stored on a non-transitory, tangible computer readable storage medium) manipulates and transforms data represented as physical (electronic) quantities within the printer's registers and memories in order to control the physical elements to create the 3D part 38. The data for the selective delivery of the build material 12, the fusing agent 26, etc. may be derived from a model of the 3D part to be formed.

The delivery piston 18 and the fabrication piston 24 may be the same type of piston, but are programmed to move in opposite directions. In an example, when a layer of the 3D part 38 is to be formed, the delivery piston 18 may be programmed to push a predetermined amount of the build material 12 out of the opening in the supply bed 16 and the fabrication piston 24 may be programmed to move in the opposite direction of the delivery piston 18 in order to increase the depth of the fabrication bed 22. The delivery piston 18 will advance enough so that when the roller 20 pushes the build material 12 into the fabrication bed 22 and onto the contact surface 23, the depth of the fabrication bed 22 is sufficient so that a layer 14 of the build material 12 may be formed in the bed 22. The roller 20 is capable of spreading the build material 12 into the fabrication bed 22 to form the layer 14, which is relatively uniform in thickness. In an example, the thickness of the layer 14 ranges from about 90 µm to about 110 µm, although thinner or thicker layers may also be used. For example, the thickness of the layer 14 may range from about 50 µm to about 200 µm.

It is to be understood that the roller 20 may be replaced by other tools, such as a blade that may be useful for spreading different types of powders, or a combination of a roller and a blade.

As shown at reference numeral 104 in FIG. 1, the layer 14 of the build material 12 may be exposed to heating after the layer 14 is applied in the fabrication bed 22 (and prior to selectively applying the fusing agent 26). Heating is performed to pre-heat the build material 12, and thus the heating temperature may be below the melting point of the build material 12. As such, the temperature selected will depend upon the build material 12 that is used. As examples, the heating temperature may be from about 5° C. to about 50° C. below the melting point of the build material 12. In an example, the heating temperature ranges from about 50° C. to about 350° C. In another example, the heating temperature ranges from about 150° C. to about 170° C.

Pre-heating the layer 14 of the build material 12 may be accomplished using any suitable heat source that exposes all of the build material 12 in the fabrication bed 22 to the heat. Examples of the heat source include a thermal heat source (e.g., a heater (not shown) of the fabrication bed 22) or an electromagnetic radiation source (e.g., infrared (IR), microwave, etc.).

After the build material 12 is applied at reference numeral 102 and/or after the build material 12 is pre-heated at reference numeral 104, the fusing agent 26 is selectively applied on at least a portion 30 of the build material 12, in the layer 14, as shown at reference number 106.

As illustrated in FIG. 1 at reference numeral 106, the fusing agent 26 may be dispensed from an inkjet applicator, such as an inkjet printhead 28. While a single printhead is shown in FIG. 1 at reference numeral 106, it is to be understood that multiple printheads may be used that span the width of the fabrication bed 22. The printhead 28 may be attached to a moving XY stage or a translational carriage (neither of which is shown) that moves the printhead 28 adjacent to the fabrication bed 22 in order to deposit the fusing agent 26 in desirable area(s) 30.

The printhead 28 may be programmed to receive commands from the central processing unit and to deposit the fusing agent 26 according to a pattern of a cross-section for the layer of the 3D object that is to be formed. As used herein, the cross-section of the layer of the object to be formed refers to the cross-section that is parallel to the contact surface 23. In the example shown in FIG. 1 at reference numeral 106, the printhead 28 selectively applies the fusing agent 26 on those portion(s) 30 of the layer 14 that are to be fused to become the first layer of the 3D part 38. As an example, if the first layer is to be shaped like a cube or cylinder, the fusing agent 26 will be deposited in a square pattern or a circular pattern (from a top view), respectively, on at least a portion of the layer 14 of the build material 12. In the example shown in FIG. 1 at reference numeral 106, the fusing agent 26 is deposited in a square pattern on the portion 30 of the layer 14 and not on the portions 32.

The fusing agent 26 includes a plasmonic resonance absorber. The plasmonic resonance absorber allows the fusing agent 26 to absorb radiation at wavelengths ranging from 800 nm to 4000 nm, which enables the fusing agent 26 to convert enough radiation to thermal energy so that the build material 12 fuses. The plasmonic resonance absorber also allows the fusing agent 26 to have transparency at wavelengths ranging from 400 nm to 780 nm, which enables the 3D part 38 to be white or slightly colored.

The absorption of the plasmonic resonance absorber is the result of the plasmonic resonance effects. Electrons associated with the atoms of the plasmonic resonance absorber may be collectively excited by electromagnetic radiation, which results in collective oscillation of the electrons. The wavelengths required to excite and oscillate these electrons collectively are dependent on the number of electrons present in the plasmonic resonance absorber particles, which in turn is dependent on the size of the plasmonic resonance absorber particles. The amount of energy required to collectively oscillate the particle's electrons is low enough that very small particles (e.g., 1-100 nm) may absorb electromagnetic radiation with wavelengths several times (e.g., from 8 to 800 or more times) the size of the particles. The use of these particles allows the fusing agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride (LaBe), tungsten bronzes ($A_xWO_3$), indium tin oxide ($In_2O_3$:$SnO_2$, ITO), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO_4$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the plasmonic resonance absorber that is present in the fusing agent 26 ranges from about 1.0 wt % to about 20.0 wt % based on the total wt % of the fusing agent 26. In some examples, the amount of the plasmonic resonance absorber present in the fusing agent 26 ranges from about 1.0 wt % up to about 10.0 wt %. In other examples, the amount of the plasmonic resonance absorber present in the fusing agent 26 ranges from greater than 4.0 wt % up to about 15.0 wt %. It is believed that these plasmonic resonance absorber loadings provide a balance between the fusing agent 26 having jetting reliability and electromagnetic radiation absorbance efficiency.

As used herein, "vehicle" may refer to the liquid fluid in which the plasmonic resonance absorber is placed to form the fusing agent 26. A wide variety of vehicles, including aqueous and non-aqueous vehicles, may be used with the plasmonic resonance absorber. In some instances, the vehicle includes water alone or a non-aqueous solvent (e.g. dimethyl sulfoxide (DMSO), ethanol, etc.) alone. In other instances, the vehicle may further include a dispersing additive, a surfactant, a co-solvent, a biocide, an anti-kogation agent, a silane coupling agent, a chelating agent, and combinations thereof.

When the vehicle is water-based, the aqueous nature of the fusing agent 26 enables the fusing agent 26 to penetrate, at least partially, into the layer 14 of the build material 12. The build material 12 may be hydrophobic, and the presence of the co-solvent, the surfactant, and/or the dispersing additive in the fusing agent 26 when the fusing agent 26 is water-based or non-aqueous based may assist in obtaining a particular wetting behavior.

The plasmonic resonance absorber in the fusing agent 26 may, in some instances, be dispersed with a dispersing additive. As such, the dispersing additive helps to uniformly distribute the plasmonic resonance absorber throughout the fusing agent 26. As mentioned above, the dispersing additive may also aid in the wetting of the fusing agent 26 onto the build material 12. Some examples of the dispersing additive include a water soluble acrylic acid polymer (e.g., CARBOSPERSE® K7028 available from Lubrizol), a styrene-acrylic pigment dispersion resin (e.g., JONCRYL® 671 available from BASF Corp.), a high molecular weight block copolymer with pigment affinic groups (e.g., DISPERBYK®-190 available BYK Additives and Instruments), and combinations thereof. Whether a single dispersing additive is used or a combination of dispersing additives is used, the total amount of dispersing additive(s) in the fusing agent 26 may range from about 10 wt % to about 200 wt % based on the wt % of the plasmonic resonance absorber in the fusing agent 26.

Surfactant(s) may also be used in the vehicle to improve the wetting properties of the fusing agent 26. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent 26 may range from about 0.1 wt % to about 3 wt % based on the total wt % of the fusing agent 26.

Some examples of the co-solvent that may be added include 1-(2-hydroxyethyl)-2-pyrollidinone, 2-Pyrrolidinone, 1,5-Pentanediol, Triethylene glycol, Tetraethylene glycol, 2-methyl-1,3-propanediol, 1,6-Hexanediol, Tripropylene glycol methyl ether, N-methylpyrrolidone, Ethoxylated Glycerol-1 (LEG-1), and combinations thereof. Whether a single co-solvent is used or a combination of co-solvents is used, the total amount of co-solvent(s) in the fusing agent 26 may range from about 10 wt % to about 80 wt % with respect to the total wt % of the fusing agent 26.

A biocide or antimicrobial may be added to the fusing agent 26. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). Whether a single biocide is used or a combination of biocides is used, the total amount of biocide(s) in the fusing agent 26 may range from about 0.1 wt % to about 1 wt % with respect to the total wt % of the fusing agent 26.

An anti-kogation agent may be included in the fusing agent 26. Kogation refers to the deposit of dried ink (e.g., fusing agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the fusing agent 26 may range from about 0.1 wt % to about 0.2 wt % based on the total wt % of the fusing agent 26.

A silane coupling agent may be added to the fusing agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent 26 may range from about 0.1 wt % to about 50 wt % based on the wt % of the plasmonic resonance absorber in the fusing agent 26. In an example, the total amount of silane coupling agent(s) in the fusing agent 26 ranges from about 1 wt % to about 30 wt % based on the wt % of the plasmonic resonance absorber. In another example, the total amount of silane coupling agent(s) in the fusing agent 26 ranges from about 2.5 wt % to about 25 wt % based on the wt % of the plasmonic resonance absorber.

The fusing agent 26 may also include other additives, such as a chelating agent. Examples of suitable chelating agents include disodium ethylenediaminetetraacetic acid (EDTA-Na) and methylglycinediacetic acid (e.g., TRILON® M from BASF Corp.). Whether a single chelating agent is used or a combination of chelating agents is used, the total amount of chelating agent(s) in the fusing agent 26 may range from 0 wt % to about 1 wt % based on the total wt % of the fusing agent 26.

The fusing agent 26 may also include a colorant in addition to the plasmonic resonance absorber. While the plasmonic resonance absorber primarily functions as an electromagnetic radiation absorber, the additional colorant may impart color to the fusing agent and the resulting 3D part 38. The amount of the colorant that may be present in the fusing agent 26 ranges from about 1 wt % to about 10 wt % of pigment(s) based on the total wt % of the fusing agent 26. The colorant may be a pigment and/or dye having any suitable color. Examples of the colors include cyan, magenta, yellow, etc. Examples of colorants include dyes, such as Acid Yellow 23 (AY 23), Acid Yellow 17 (AY 17), Acid Red 52 (AR 52), Acid Red 289 (AR 289), Reactive Red 180 (RR 180), Direct Blue 199 (DB 199), or pigments, such as Pigment Blue 15:3 (PB 15:3), Pigment Red 122 (PR 122), Pigment Yellow 155 (PY 155), and Pigment Yellow 74 (PY 74).

Some examples of the fusing agent 26 that include colorant are shown in Table 1 below.

TABLE 1

| Ingredient | Specific component | Cyan Fusing Agent (wt %) | Magenta Fusing agent (wt %) | Yellow Fusing agent (wt %) |
|---|---|---|---|---|
| Co-solvent | 2-pyrrolidone | 20.00 | 20.00 | 20.00 |
| Anti-Kogation agent | CRODAFOS ® O3A | 0.50 | 0.50 | 0.50 |
| Surfactant | SURFYNOL ® SEF | 0.75 | 0.75 | 0.75 |
|  | CAPSTONE ® FS-35 | 0.05 | 0.05 | 0.05 |
| Dispersing additive | CARBOSPERSE ® K 7028 | 0.01 | 0.01 | 0.01 |
| Chelating agent | TRILON ® M | 0.04 | 0.04 | 0.04 |
| Biocide | PROXEL ® GXL | 0.18 | 0.18 | 0.18 |
|  | KORDEK ® MLX | 0.14 | 0.14 | 0.14 |
| Plasmonic resonance absorber | Cesium tungsten oxide stock dispersion | 25 | 25 | 25 |
| Colorant | PB 15:3 | 2 | 0 | 0 |
|  | PR 122 | 0 | 4 | 0 |
|  | PY 74 | 0 | 0 | 2 |
| Water |  | Balance | Balance | Balance |

While not shown in FIG. 1, the method 100 may further include preparing the fusing agent 26. In one example, the fusing agent 26 may be prepared by adding the plasmonic resonance absorber to a millbase to form a mixture. The millbase may include water, the silane coupling agent (e.g., SILQUEST® A manufactured by Momentive, ect.), citric acid, a co-solvent (e.g., 2-pyrrolidone), a wetting agent (e.g., isopropyl alcohol), or a combination thereof. The mixture may be milled to reduce the average particle diameter of the plasmonic resonance absorber to less than 220 nm, and to form a dispersion. Any suitable milling technique may be used. In an example, an Ultra-Apex Bead Mill (Kotobuki) may be used with 50 μm zirconia beads. The rotor speed of the Ultra-Apex Bead Mill may range from about 8 m/s to about 10 m/s. In another example, a laboratory shaker may be used with 650 μm zirconium beads. In still another example, a Fritsch mill may be used with 200 μm zirconia beads. The rotor speed of the Fritsch mill may be 400 rotations per minute. In any of these examples, the mixture may be milled for about 1 hour to about 10 hours. Alternatively, in any of the above examples, the mixture may be alternated between being milled for about 1 minute to about 3 minutes and resting for about 3 minutes to about 10 minutes for about 100 repetitions to about 140 repetitions. The dispersion may be collect from the beads by adding water to obtain from about 5 wt % to about 10 wt % of non-volatile solids (NVS) (based on the total wt % of the dispersion). In an example, the amount of the plasmonic resonance absorber may be from about 3 wt % to about 5 wt % of the total wt % of the dispersion. The dispersion may then be incorporated into the aqueous or non-aqueous vehicle to form the fusing agent 26. When a colorant is included in the fusing agent 26, it may be milled with the plasmonic resonance absorber, or it may be added to the aqueous or non-aqueous vehicle.

In another example, the fusing agent 26 may be prepared by first extracting or removing the plasmonic resonance absorber from another dispersion. This process may involve diluting the dispersion and centrifuging the diluted dispersion to separate the plasmonic resonance absorber from other dispersion components. The plasmonic resonance absorber may then be milled and added to the aqueous or non-aqueous vehicle to form the fusing agent 26. When a colorant is included in the fusing agent 26, it may be milled with the plasmonic resonance absorber, or it may be added to the aqueous or non-aqueous vehicle.

In still another example, the fusing agent 26 may be prepared by diluting a tungsten bronze dispersion (such as a cesium tungsten oxide dispersion) with 2-pyrrolidone at 1:1 w/w to form a diluted dispersion. In one example, the cesium tungsten oxide dispersion, prior to dilution, may contain about 25 wt % cesium tungsten oxide and 75 wt % solvent (e.g., butyl acetate, 2-methoxy-1-methylethyl acetate, dipropylene glycol monomethyl ether (DPM), etc.) (based on the total wt % of the cesium tungsten oxide dispersion). The diluted dispersion may be distilled at a temperature of about 60° C. and a pressure of about 20 mm Hg to form a stock dispersion including the plasmonic resonance absorber. The stock dispersion may then be incorporated into the aqueous or non-aqueous vehicle to form the fusing agent 26. When included, the colorant may be added to the aqueous or non-aqueous vehicle. In an example, the fusing agent 26 includes from about 25 wt % to about 50 wt % of the stock dispersion including the plasmonic resonance absorber (based on the total wt % of the fusing agent 26).

It is to be understood that a single fusing agent 26 may be selectively applied to form the layer of the 3D part 38, or multiple fusing agents 26 may be selectively applied to form the layer of the 3D part 38.

After the fusing agent 26 is selectively applied in the desired portion(s) 30, the entire layer 14 of the build material 12 (including the fusing agent 26 applied to at least a portion thereof) is exposed to electromagnetic radiation 36. This is shown at reference numeral 108 of FIG. 1.

The electromagnetic radiation 36 is emitted from a radiation source 34, such as an IR or near-IR curing lamp, IR or near-IR light emitting diodes (LED), a magnetron that emits microwaves, or lasers with the desirable electromagnetic wavelengths. As an example, the radiation source 34 is a near-infrared light source with wavelengths ranging from about 800 nm to about 2 μm.

In an example, the electromagnetic radiation 36 may include wavelengths ranging from about 100 nm (UV) to about 10 μm. In yet another example, the light source electromagnetic wavelengths range from about 400 nm to about 3 μm or 4 μm (which includes near-infrared and mid-infrared radiation). As an example, the electromagnetic radiation 36 is blackbody radiation with a maximum intensity at a wavelength of about 1100 nm.

Any radiation source 34 may be used that emits electromagnetic radiation. The radiation source 34 may be attached, for example, to a carriage that also holds the inkjet printhead(s) 28. The carriage may move the radiation source 34 into a position that is adjacent to the fabrication bed 22. The radiation source 34 may be programmed to receive commands from the central processing unit and to expose the layer 14, including the fusing agent 26 and build material 12, to electromagnetic radiation 36.

The length of time the radiation 36 is applied for, or energy exposure time, may be dependent, for example, on one or more of: characteristics of the radiation source 34; characteristics of the build material 12; and/or characteristics of the fusing agent 26.

The fusing agent 26 enhances the absorption of the radiation 36, converts the absorbed radiation to thermal energy, and promotes the transfer of the thermal heat to the build material 12 in contact therewith (i.e., in the portion 30). In an example, the fusing agent 26 sufficiently elevates the temperature of the build material 12 above the melting point(s), allowing curing (e.g., sintering, binding, fusing, etc.) of the build material particles 12 in contact with the fusing agent 26 to take place. In an example, the temperature is elevated about 50° C. above the melting temperature of the build material 12. The fusing agent 26 may also cause, for example, heating of the build material 12, below its melting point but to a temperature suitable to cause softening and bonding. It is to be understood that portions 32 of the build material 12 that do not have the fusing agent 26 applied thereto do not absorb enough energy to fuse. Exposure to radiation 36 forms the 3D layer or part 38, as shown at reference numeral 108 in FIG. 1.

While the 3D part 38 is shown as a single layer, it is to be understood that the 3D part 38 may include several layers. Each additional layer of the 3D part 38 may be formed by repeating reference numerals 102-108. For example, to form an additional layer of the 3D part 38, an additional layer of the build material 12 may be applied to the 3D part 38 shown in reference numeral 108 and the additional layer may be preheated, may have the fusing agent 26 selectively applied thereto, and may be exposed to radiation 36 to form that additional layer. Any number of additional layers may be formed. When the 3D object 38 is complete, it may be removed from the fabrication bed 22, and any uncured build material 12 may be washed and then reused.

Figure 2:
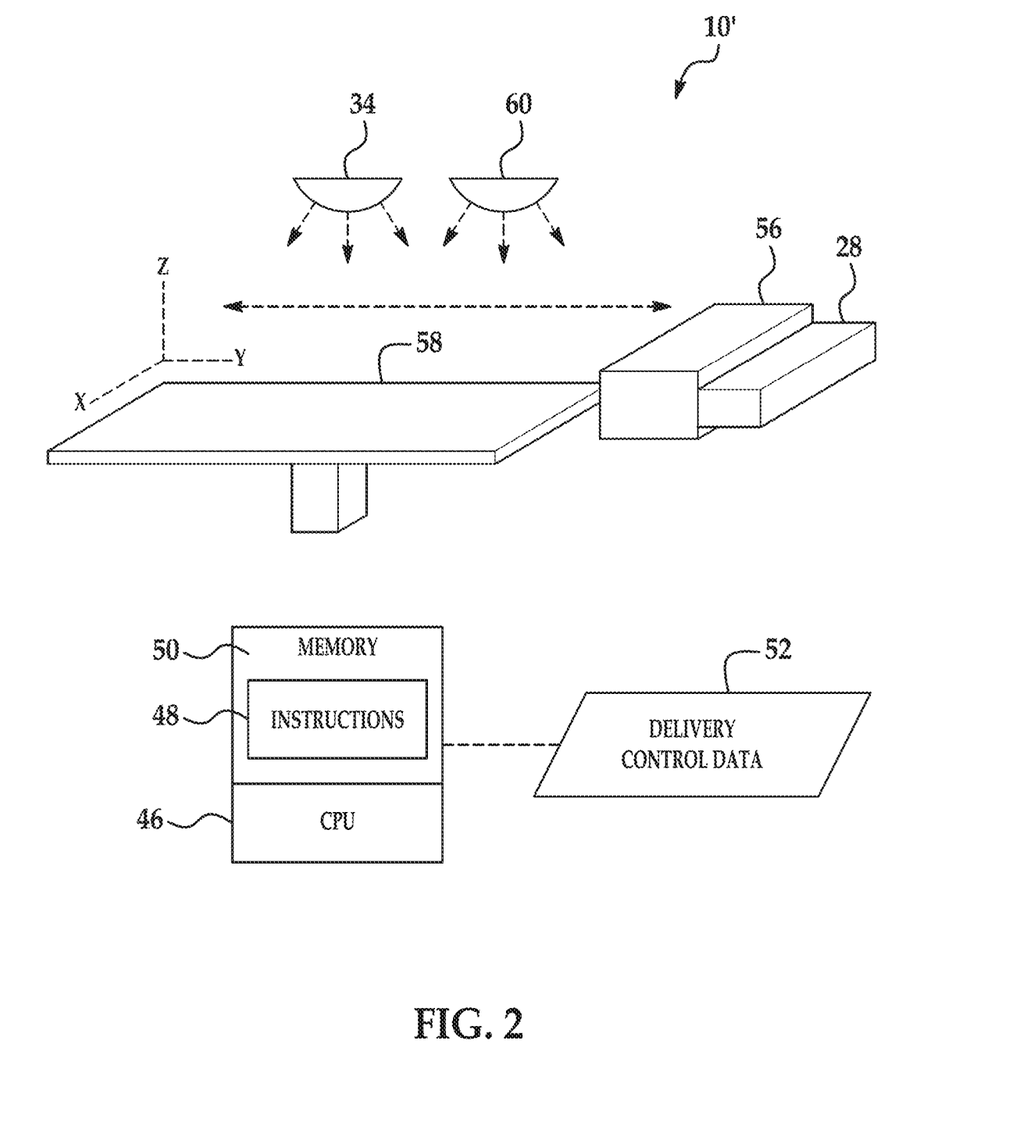
FIG. 2 is a simplified isometric view of an example of a 3D printing system disclosed herein.

Referring now to FIG. 2, another example of the printing system 10' is depicted. The system 10' includes a central processing unit 46 that controls the general operation of the additive printing system 10'. As an example, the central processing unit 46 may be a microprocessor-based controller that is coupled to a memory 50, for example via a communications bus (not shown). The memory 50 stores the computer readable instructions 48. The central processing unit 46 may execute the instructions 48, and thus may control operation of the system 10' in accordance with the instructions 48. For example, the instructions may cause the controller to utilize a build material distributor 56 to dispense the build material 12, and to utilize fusing agent distributor 28 (e.g., an inkjet applicator 28) to selectively dispense the fusing agent 26 to form a three-dimensional part.

In this example, the printing system 10' includes a fusing agent distributor 28 to selectively deliver fusing agent 26 to portion(s) 30 of the layer (not shown in this figure) of build material 12 provided on a support member 58.

The central processing unit 46 controls the selective delivery of the fusing agent 26 to the layer of the build material 12 in accordance with delivery control data 52.

In the example shown in FIG. 2, it is to be understood that the distributor 28 is a printhead(s), such as a thermal printhead(s) or a piezoelectric inkjet printhead(s). The printhead(s) 28 may be a drop-on-demand printhead(s) or a continuous drop printhead(s).

The printhead(s) 28 may be used to selectively deliver the fusing agent 26, when in the form of a suitable fluid. As described above, the fusing agent 26 includes an aqueous or non-aqueous vehicle, such as water, co-solvent(s), surfactant(s), etc., to enable it to be delivered via the printhead(s) 28.

In one example the printhead(s) 28 may be selected to deliver drops of the fusing agent 26 at a resolution ranging from about 300 dots per inch (DPI) to about 1200 DPI. In other examples, the printhead(s) 28 may be selected to be able to deliver drops of the fusing agent 26 at a higher or lower resolution. The drop velocity may range from about 5 m/s to about 24 m/s and the firing frequency may range from about 1 kHz to about 100 kHz.

The printhead(s) 28 may include an array of nozzles through which the printhead(s) 28 is able to selectively eject drops of fluid. In one example, each drop may be in the order of about 10 pico liters (pl) per drop, although it is contemplated that a higher or lower drop size may be used. In some examples, printhead(s) 28 is able to deliver variable size drops.

The printhead(s) 28 may be an integral part of the printing system 10', or it may be user replaceable. When the printhead(s) 28 is user replaceable, they may be removably insertable into a suitable distributor receiver or interface module (not shown).

As shown in FIG. 2, the distributor 28 may have a length that enables it to span the whole width of the support member 58 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 58. In other examples of the printing system 10', the distributor 28 may have a shorter length that does not enable it to span the whole width of the support member 58.

While not shown in FIG. 2, it is to be understood that the distributor 28 may be mounted on a moveable carriage to enable it to move bi-directionally across the length of the support member 58 along the illustrated y-axis. This enables selective delivery of the fusing agent 26 across the whole width and length of the support member 58 in a single pass. In other examples, the distributor 28 may be fixed while the support member 58 is configured to move relative thereto.

As used herein, the term 'width' generally denotes the shortest dimension in the plane parallel to the X and Y axes shown in FIG. 2, and the term 'length' denotes the longest dimension in this plane. However, it is to be understood that in other examples the term 'width' may be interchangeable with the term 'length'. As an example, the distributor 28 may have a length that enables it to span the whole length of the support member 58 while the moveable carriage may move bi-directionally across the width of the support member 58.

In examples in which the distributor 28 has a shorter length that does not enable it to span the whole width of the support member 58, the distributor 28 may also be movable bi-directionally across the width of the support member 58 in the illustrated X axis. This configuration enables selective delivery of the fusing agent 26 across the whole width and length of the support member 58 using multiple passes.

The distributor 28 may include therein a supply of the fusing agent 26 or may be operatively connected to a separate supply of the fusing agent 26.

As shown in FIG. 2, the printing system 10' also includes a build material distributor 56. This distributor 56 is used to provide the layer (e.g., layer 14) of the build material 12 on the support member 58. Suitable build material distributors 56 may include, for example, a wiper blade, a roller, or combinations thereof.

The build material 12 may be supplied to the build material distributor 56 from a hopper or other suitable delivery system. In the example shown, the build material distributor 56 moves across the length (Y axis) of the support member 58 to deposit a layer of the build material 12. As previously described, a first layer of build material 12 will be deposited on the support member 58, whereas subsequent layers of the build material 12 will be deposited on a previously deposited (and solidified) layer (e.g., layer 38).

It is to be further understood that the support member 58 may also be moveable along the Z axis. In an example, the support member 58 is moved in the Z direction such that as new layers of build material 12 are deposited, a predetermined gap is maintained between the surface of the most recently formed layer and the lower surface of the distributor 28. In other examples, however, the support member 58 may be fixed along the Z axis and the distributor 28 may be movable along the Z axis.

Similar to the system 10 (shown in FIG. 1), the system 10' also includes the radiation source 34 to apply energy to the deposited layer of build material 12 and the fusing agent 26 to cause the solidification of portion(s) 30 of the build material 12. Any of the previously described radiation sources 34 may be used. In an example, the radiation source 34 is a single energy source that is able to uniformly apply energy to the deposited materials, and in another example, radiation source 34 includes an array of energy sources to uniformly apply energy to the deposited materials.

In the examples disclosed herein, the radiation source 34 is configured to apply energy in a substantially uniform manner to the whole surface of the deposited build material 12. This type of radiation source 34 may be referred to as an unfocused energy source. Exposing the entire layer to energy simultaneously may help increase the speed at which a three-dimensional object may be generated.

While not shown, it is to be understood that the radiation source 34 may be mounted on the moveable carriage or may be in a fixed position.

The central processing unit 46 may control the radiation source 34. The amount of energy applied may be in accordance with delivery control data 52.

The system 10' may also include a pre-heater 60 that is used to pre-heat the deposited build material 12 (as shown and described in reference to FIG. 1 at reference numeral 104). The use of the pre-heater 60 may help reduce the amount of energy that has to be applied by the radiation source 34.

To further illustrate the present disclosure, examples are given herein. It is to be understood that these examples are provided for illustrative purposes and are not to be construed as limiting the scope of the present disclosure.

EXAMPLES

Example 1

Three examples of the plasmonic resonance absorber were prepared. The plasmonic resonance absorber used in the examples was lanthanum hexaboride ($LaB_6$). The samples of lanthanum hexaboride were manufactured by Aldrich or SkySpring Nanosystems. Each example of the plasmonic resonance absorber was added to a millbase and milled to reduce its particle size. The general formulations of the millbase composition used for each mill are shown in Table 2, with the wt % of each component that was used.

TABLE 2

| Ingredient | Specific component | Mill 1 (wt %) | Mill 2 (wt %) | Mill 3 (wt %) |
|---|---|---|---|---|
| Plasmonic resonance absorber | Lanthanum hexaboride (Aldrich) | 5 | 0 | 14 |
| | Lanthanum hexaboride (SkySpring Nanosystems) | 0 | 2.5 | 0 |
| | Lanthanum hexaboride (Colorflex) | 0 | 0 | 0 |
| Co-solvent | 2-pyrrolidone | 0 | 0 | 20 |
| Wetting agent | Isopropyl alcohol | 0 | 0 | 2 |
| Silane coupling agent | SILQUEST ® A | 40 | 20 | 0 |
| Dispersing Additive | JONCRYL ® 671 | 0 | 0 | 6 |
| Additive | Citric acid | 8 | 5 | 0 |
| Water | | Balance | Balance | Balance |

The lanthanum hexaboride used in mill 1 had an initial average particle size of about 1 μm. The slurry formed of the lanthanum hexaboride and the millbase used in mill 1 had a pH of 8.0. The slurry of mill 1 was milled in an Ultra-Apex Bead Mill (UAM-015 manufactured by Kotobuki) with 50 μm zirconia beads at a rotor speed of about 8 m/s to about 10 m/s for 5 hours. The particle size of the lanthanum hexaboride after milling was 127 nm.

The lanthanum hexaboride used in mill 2 had an initial average particle size of about 1 μm. The slurry formed of the lanthanum hexaboride and the millbase used in mill 2 had a pH of 8.5. The slurry of mill 2 was milled in an Ultra-Apex Bead Mill (UAM-015 manufactured by Kotobuki) with 50 μm zirconia beads at a rotor speed of about 8 m/s to about 10 m/s for 2 hours. The particle size of the lanthanum hexaboride after milling was 8 nm.

The lanthanum hexaboride used in mill 3 had an initial average particle size of about 1 μm. The slurry formed of the lanthanum hexaboride and the millbase used in mill 3 was milled with a laboratory shaker with 650 μm zirconium beads for 9 hours. The particle size of the lanthanum hexaboride after milling was 210 nm.

This example illustrates that various forms of lanthanum hexaboride can be processed to obtain a particle size suitable for inkjet printing, and for use in a fusing agent.

Example 2

Three examples of the fusing agent were prepared. The plasmonic resonance absorber used in the example fusing agent compositions was either cesium tungsten oxide (in a stock dispersion) or lanthanum hexaboride (LaB$_6$). The general formulations of the example fusing agent compositions are shown in Table 3, with the wt % of each component that was used.

TABLE 3

| Ingredient | Specific component | Fusing agent 1 (wt %) | Fusing agent 2 (wt %) | Fusing agent 3 (wt %) |
|---|---|---|---|---|
| Co-solvent | 2-pyrrolidone | 20.00 | 20.00 | 20.00 |
| | Isopropyl alcohol | 0 | 0 | 0.16 |
| Anti-Kogation agent | CRODAFOS ® O3A | 0.50 | 0.50 | 0.50 |
| Surfactant | SURFYNOL ® SEF | 0.75 | 0.75 | 0.75 |
| | CAPSTONE ® FS-35 | 0.05 | 0.05 | 0.05 |
| Dispersing additive | CARBOSPERSE ® K 7028 | 0.01 | 0.01 | 0.01 |
| | JONCRYL ® 671 | 0 | 0 | 0.48 |
| Chelating agent | TRILON ® M | 0.04 | 0.04 | 0.04 |
| Biocide | PROXEL ® GXL | 0.18 | 0.18 | 0.18 |
| | KORDEK ® MLX | 0.14 | 0.14 | 0.14 |
| Silane coupling agent | SILQUEST ® A | 0 | 0 | 0.28 |
| Plasmonic resonance absorber | Cesium tungsten oxide stock dispersion | 50 | 25 | 0 |
| | Lanthanum hexaboride (Aldrich) | 0 | 0 | 1.12 |
| Water | | Balance | Balance | Balance |

The cesium tungsten oxide stock dispersion used in fusing agents 1 and 2 was prepared using a commercially available, cesium tungsten oxide dispersion, namely YMS-01A-2 (manufactured by Sumitomo Metals Co.). The general formulation of YMS-01A-2 as described by the manufacturer in the Material Safety Data Sheet is shown in Table 4, with the wt % of each component.

TABLE 4 cesium tungsten oxide dispersion -YMS-01A-2

| Ingredient | Specific component | wt % |
|---|---|---|
| Solvent | butyl acetate | 1.7 |
| | 2-methoxy-1-methylethyl acetate | 58.9 |
| | dipropylene glycol monomethyl ether (DPM) | 1.9 |
| cesium tungsten oxide | | 25 |
| Others | Information not available | 12.5 |

The YMS-01A-2 cesium tungsten oxide dispersion was diluted with 2-pyrrolidone at 1:1 w/w. The diluted dispersion was distilled at a temperature of 60° C. and a pressure of 20 mm Hg. The resulting dispersion was a deep blue, non-opaque fluid, containing 25 wt % of solids (based on the total wt % of the dispersion), and was used as the cesium tungsten oxide stock dispersion in fusing agents 1 and 2.

Fusing agents 1 and 2 were prepared by mixing together all of the fusing agent components except for the cesium tungsten oxide stock dispersion (i.e., 2-pyrrolidone, CRODAFOS® O3A, SURFYNOL® SEF, CAPSTONE® FS-35, CARBOSPERSE® K 7028, TRILON® M, PROXEL® GXL, KORDEK® MLX, and water). The mixture was put on a magnetic stirrer, and the cesium tungsten oxide stock dispersion was added drop-wise under constant mixing. The resulting cesium tungsten oxide fusing agents (i.e., fusing agents 1 and 2) were light blue, slightly opaque fluids.

The lanthanum hexaboride used in fusing agent 3 was generated by mill 3 from example 1. Except for the components in the dispersed solution that resulted from mill 3, all of the other fusing agent components for fusing agent 3 (i.e., 18.4 wt % 2-pyrrolidone, CRODAFOS® O3A, SURFYNOL® SEF, CAPSTONE® FS-35, CARBOSPERSE® K 7028, TRILON® M, PROXEL® GXL, KORDEK® MLX, and 71.93 wt % water (based on the total wt % of the fusing agent)) were mixed together and put on a stirrer bar. The dispersed solution that resulted from mill 3 (i.e., lanthanum hexaboride (Aldrich), JONCRYL® 671, isopropyl alcohol, 1.6 wt % 2-pyrrolidone, and 4.64 wt % water (based on the total wt % of the fusing agent)) was added drop-wise under constant mixing. The resulting lanthanum hexaboride fusing agent (i.e., fusing agent 3) was a green, slightly opaque fluid.

This example illustrates that various fusing agents can be formulated using examples of the plasmonic resonance absorber disclosed herein.

Example 3

Two examples and one comparative example of tensile testing specimens ("dog bones") were printed. The build material used to print the example and comparative dog bones was polyamide-12 (PA-12). The fusing agent used to print the example dog bones was either fusing agent 1 from example 2 or fusing agent 3 from example 2. The fusing agent used to print the comparative dog bones was a carbon black-based fusing agent. The carbon-black based fusing agent had a formulation similar to the black ink in an HP 88 printhead.

For each example and comparative dog bone, the fusing agent was thermal inkjet printed with a HP761 printhead (manufactured by Hewlett-Packard Company) in a pattern on a portion of the PA-12 in subsequent layers. Each layer was about 100 µm in thickness. New layers were spread onto the fabrication bed from a supply region using a roller. The temperature of the supply region was set at 130° C. The temperature of the printing region was set at 160° C. with a platen underneath it heated to 165° C. The example and comparative dog bones were printed at an ink density of 1.25 drops per pixel at 600 dpi resolution. The example and comparative dog bones were then exposed to high-intensity light from two sets of two 500 watt halogen bulbs passing over the fabrication bed. After the fusing agent was applied, the fabrication bed experienced three lamp exposures per layer. After all layers were printed, the example and comparative dog bones were removed from the fabrication bed and sandblasted to remove excess powder.

For comparative example 1, 12 dog bones were printed (labeled CLB_#, CRF_#, CRB_#, CLF_#, where the # corresponds with the fuse speed used). The speed at which the halogen bulbs passed over the fabrication bed (i.e., fuse speed) was either 20 inches per second (ips), 23 ips, or 28 ips. The density was measured for each dog bone printed with the carbon black-based fusing agent. The results of the density measurements are shown below in Table 5.

TABLE 5

| Specimen | Fuse speed (ips) | Density (% theoretical) |
|---|---|---|
| CLB_20 | 20 | 96.7 |
| CRF_20 | 20 | 98.3 |
| CRB_20 | 20 | 97.2 |
| CLF_20 | 20 | 100.6 |
| CRF_23 | 23 | 91.1 |
| CLF_23 | 23 | 93.9 |
| CLB_23 | 23 | 92.2 |
| CRB_23 | 23 | 96.1 |
| CRF_28 | 28 | 86.7 |
| CLF_28 | 28 | 88.9 |
| CLB_28 | 28 | 88.3 |
| CRB_28 | 28 | 89.4 |

For the examples printed with fusing agent 1, seven dog bones were printed (labeled LB #, RF_#, RB_#, LF_#, where the # corresponds with the fuse speed used). The fuse speed was either 20 ips or 16 ips. The strength, percent (%) elongation, Young's Modulus, and mass were measured for each dog bone printed with fusing agent 1. These tensile tests were carried out on an INSTRON® tensile testing machine. The results of these measurements are shown below in Table 6.

TABLE 6

| Specimen | Fuse speed (ips) | Strength (MPa) | % Elongation (%) | Young's Modulus (MPa) | Mass (g) | Density (% theoretical) |
|---|---|---|---|---|---|---|
| LB_20 | 20 | 39.83 | 32.08 | 1266 | 1.75 | 97.2 |
| RF_20 | 20 | 37.61 | 22.41 | 1093 | 1.68 | 93.3 |
| RB_20 | 20 | 38.03 | 24.66 | 1097 | 1.66 | 92.2 |
| LF_20 | 20 | 39.39 | 37.37 | 1071 | 1.74 | 96.7 |
| RF_16 | 16 | 37.99 | 42.98 | 1076 | 1.91 | 106 |
| LF_16 | 16 | 38.27 | 44.50 | 1183 | 1.95 | 108 |
| LB_16 | 16 | 39.21 | 35.32 | 1162 | 1.98 | 110 |

The masses obtained for the dog bones printed with fusing agent 1 were within 10% (+/−) of the theoretical (fully fused) mass of 1.8 g for cesium tungsten oxide fused parts. The dog bones produced with fusing agent 1 at 20 ips are very close in density to the black dog bones produced with the carbon black-based fusing agent at the same fuse speed. Obtaining such high densities with fusing agent 1 was unexpected because the optical density of fusing agent 1 is substantially lower than than the optical density of the carbon black-based fusing agent (see below). An overall comparison of the masses of the dog bones printed with fusing agent 1 and the dog bones printed with the carbon black-based fusing agent indicates that a slower fusing speed helps to obtain higher density.

The elongation of the dog bones printed with fusing agent 1 was excellent compared to the typical elongation (i.e., 14%) of the dog bones printed with the carbon black-based fusing agent. The strength and Young's Modulus of the dog bones printed with fusing agent 1 were within an acceptable range (i.e., ≥36 MPa and ≥900 MPa, respectively) and were only slightly lower than the typical strength (i.e., ~43 MPa) and Young's Modulus (i.e., 1650 MPa) of the dog bones printed with the carbon black-based fusing agent. The increase in the elastic and/or plastic behavior (as demonstrated by elongation measurement) and acceptable strength and Young's Modulus measurements demonstrate that fusing agent 1 works well as a fusing agent.

These results indicate that a cesium tungsten oxide-based fusing agent can function well as a fusing agent to print parts with acceptable fuse speed, strength, percent (%) elongation, Young's Modulus, and mass.

For the examples printed with fusing agent 3, four dog bones were printed. The fuse speed was 16 ips. The mass was measured for each dog bone printed with fusing agent 3. The results of these measurements are shown below in Table 7.

TABLE 7

| Specimen | Fuse speed (ips) | Mass (g) |
|---|---|---|
| RF | 16 | 0.72 |
| LF | 16 | 0.77 |
| RB | 16 | 0.80 |
| LB | 16 | 0.80 |

The masses obtained for the dog bones printed with fusing agent 3 were 39% of the theoretical (fully fused) mass of 1.8 g for lanthanum hexaboride fused parts. The low mass of the dog bones printed with fusing agent 3 may be due, at least in part, to the lower amount of plasmonic absorber in fusing agent 3.

These results indicate that a lanthanum hexaboride-based fusing agent can function as a fusing agent to print solid parts. The mass of parts formed with fusing agent 3 may be increased by incorporating more of the plasmonic absorber in the fusing agent.

The optical density of fusing agent 1, fusing agent 3, and the carbon black-based fusing agent was measured using an X-rite eXact™ densitometer. The results of the optical density measurements are shown below in Table 8.

TABLE 8

| Fusing agent | Optical density |
|---|---|
| Fusing agent 1 (cesium tungsten oxide) | 0.59 ± 0.2 |
| Fusing agent 3 (lanthanum hexaboride) | 0.21 ± 0.02 |
| Carbon black-based fusing agent | 0.92 ± 0.1 |

Figure 3:
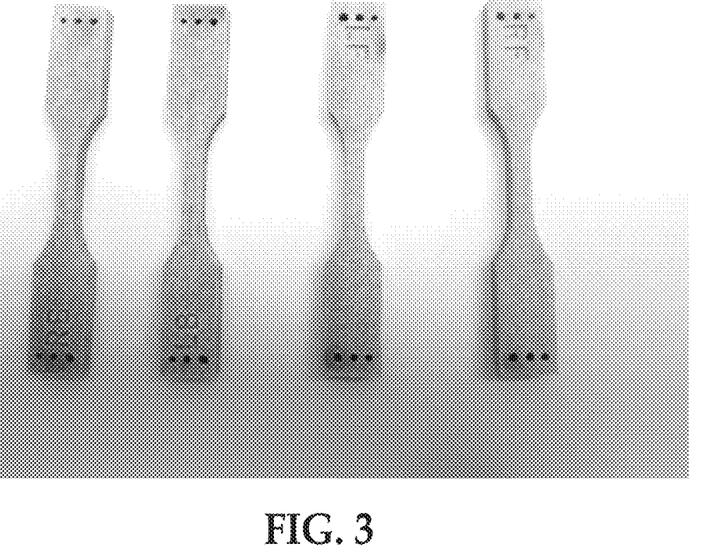
FIG. 3 is a photographic image of 3D printed parts formed by an example of the 3D printing method disclosed herein.
Figure 4:
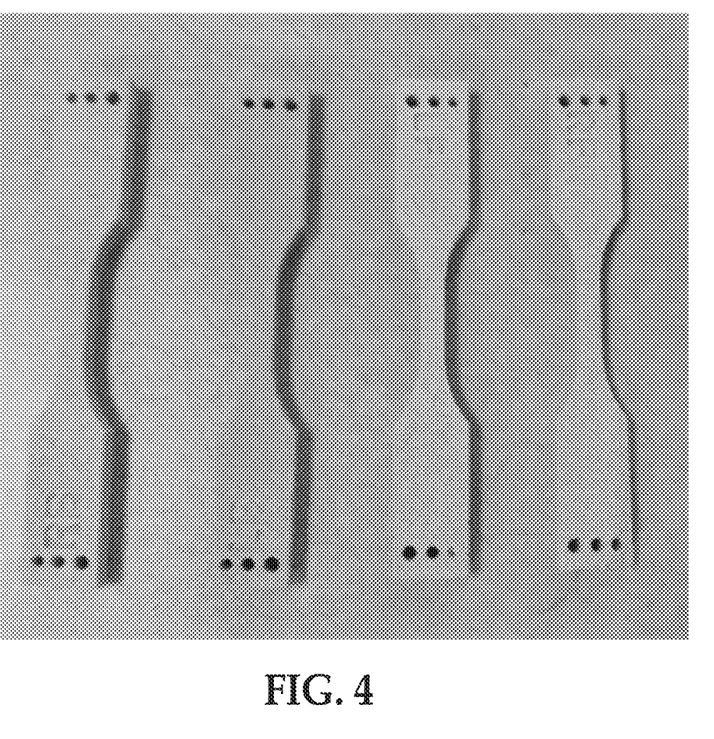
FIG. 4 is a photographic image of other 3D printed parts formed by another example of the 3D printing method disclosed herein.

As shown in Table 8, the optical density of fusing agent 1 is 0.31 less than the carbon black-based fusing agent. The dog bones printed with fusing agent 1 had a light bluish hue. A black and white photographic image of specimens RB_20, LB_20, LF_20, and RF_20 (from right to left) printed with fusing agent 1 is shown in FIG. 3. Also shown in Table 8 is that the optical density of fusing agent 3 is 0.71 less than the optical density of the carbon black-based fusing agent. The dog bones printed with fusing agent 3 had a light greenish hue. A black and white photographic image of specimens RB, LB, LF, and RF (from right to left) printed with fusing agent 3 is shown in FIG. 4. These results indicate that either a cesium tungsten oxide-based fusing agent or a lanthanum hexaboride-based fusing agent can be used to print parts with lower optical density and/or a lighter hue (e.g., than parts printed with a carbon black-based fusing agent).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50° C. to about 350° C. should be interpreted to include not only the explicitly recited limits of about 50° C. to about 350° C., but also to include individual values, such as 57° C., 95° C., 225° C., 300° C., etc., and sub-ranges, such as from about 70° C. to about 325° C., from about 60° C. to about 170° C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:
1. A three-dimensional (3D) printing method, comprising:
   preparing a fusing agent by:
      diluting a dispersion including a plasmonic resonance absorber which is an inorganic pigment selected from the group consisting of lanthanum hexaboride, tungsten bronzes, indium tin oxide, aluminum zinc oxide, ruthenium oxide, silver, gold, platinum, iron pyroxenes, modified iron phosphates ($A_xFe_yPO_4$), modified copper pyrophosphates ($A_xCu_yP_2O_7$), and combinations thereof;
      centrifuging the diluted dispersion to separate the plasmonic resonance absorber;
      milling the plasmonic resonance absorber; and
      incorporating the plasmonic resonance absorber into an aqueous or non-aqueous vehicle including a silane coupling agent;
   applying a polymeric or polymeric composite build material;
   selectively applying the fusing agent on at least a portion of the polymeric or polymeric composite build material; and
   exposing the polymeric or polymeric composite build material to electromagnetic radiation, thereby fusing the portion of the polymeric or polymeric composite build material in contact with the fusing agent to form a layer.
2. The method as defined in claim 1 wherein the aqueous vehicle includes water, a co-solvent, an anti-kogation agent, a surfactant, a dispersing additive, a chelating agent, and a biocide.
3. The method as defined in claim 1, further comprising incorporating a colorant into the aqueous or non-aqueous vehicle.
4. The method as defined in claim 1 wherein prior to selectively applying the fusing agent, the method further comprises heating the polymeric or polymeric composite build material to a temperature ranging from about 50° C. to about 350° C.
5. The method as defined in claim 1 wherein the fusing agent includes from about 1 wt % to about 10 wt % of the plasmonic resonance absorber.
6. A three-dimensional (3D) printing method, comprising:
   preparing a fusing agent by:
      diluting a cesium tungsten oxide dispersion with 2-pyrrolidone at 1:1 w/w to form a diluted dispersion;
      distilling the diluted dispersion at a temperature of about 60° C. and a pressure of about 20 mm Hg to form a stock dispersion including a plasmonic resonance absorber; and
      incorporating the stock dispersion into an aqueous or non-aqueous vehicle;
   applying a polymeric or polymeric composite build material;
   selectively applying the fusing agent on at least a portion of the polymeric or polymeric composite build material; and
   exposing the polymeric or polymeric composite build material to electromagnetic radiation, thereby fusing the portion of the polymeric or polymeric composite build material in contact with the fusing agent to form a layer.
7. The method as defined in claim 6 wherein the aqueous vehicle includes water, a co-solvent, an anti-kogation agent, a surfactant, a dispersing additive, a chelating agent, and a biocide.

* * * * *